United States Patent [19]

Hodgson

[11] 4,187,088
[45] Feb. 5, 1980

[54] DOWN FLOW CENTRIFUGAL SEPARATOR

[75] Inventor: Robert A. Hodgson, Tulsa, Okla.

[73] Assignee: Maloney-Crawford Corporation, Tulsa, Okla.

[21] Appl. No.: 4,485

[22] Filed: Jan. 18, 1979

[51] Int. Cl.² ............................................. B01D 41/12
[52] U.S. Cl. .................................... 55/169; 55/185; 55/204; 55/459 C; 55/463; 55/465
[58] Field of Search .............. 55/176, 177, 184, 185, 55/190, 201, 204, 392, 459 C, 426, 16, 463, 465; 210/188

[56] References Cited

U.S. PATENT DOCUMENTS

| | | | |
|---|---|---|---|
| 1,923,598 | 8/1933 | Walker | 55/184 X |
| 1,923,599 | 8/1933 | Walker | 55/184 |
| 2,016,641 | 10/1955 | Lincoln | 55/169 |
| 2,692,026 | 10/1954 | Frantz | 55/426 X |
| 4,017,275 | 4/1977 | Hodgson et al. | 55/177 X |

Primary Examiner—John Adee
Attorney, Agent, or Firm—Head & Johnson

[57] ABSTRACT

A gas-liquid separator of the centrifugal type wherein the mixture is first introduced into a top chamber of a vertical vessel where it is given a spinning motion forming a vortex with liquid initially separated and drained to an intermediate chamber and then to a lower chamber for removal. The remaining gas-liquid enters a centrally located vortex tube where additional entrained liquid is skimmed off at a slot open to the intermediate chamber. Additional separation occurs as the gas and remaining liquid entrained therein strikes a conical surface and other diversion baffles.

5 Claims, 5 Drawing Figures

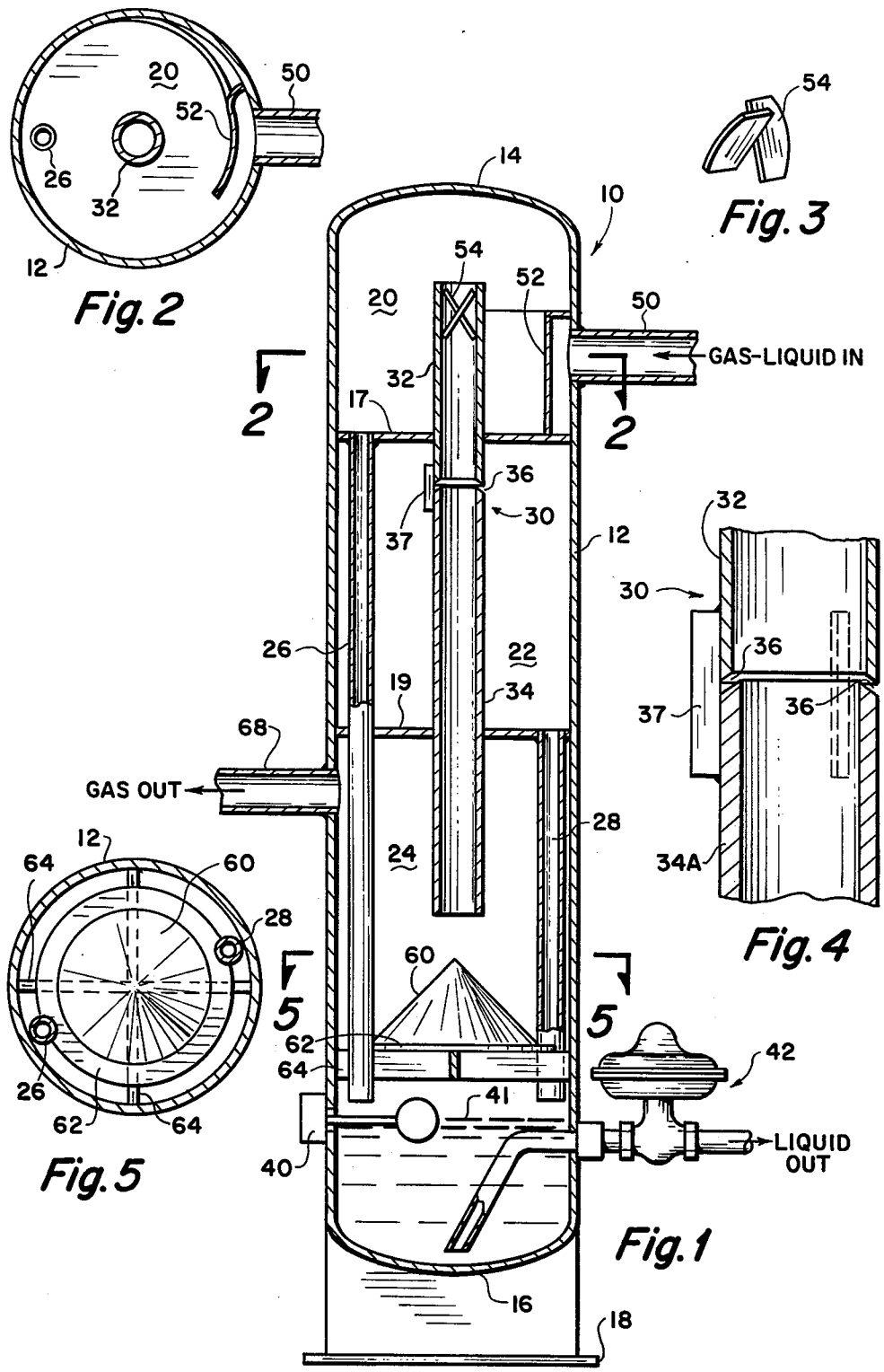

DOWN FLOW CENTRIFUGAL SEPARATOR

RELATED PATENTS

This invention is related to U.S. Pat. No. 4,017,275.

BACKGROUND OF THE INVENTION

The invention relates to a gas-liquid separator of the centrifugal type. Heretofore, separators of this type have the gas and entrained liquid mixture entering from a lower part of the vessel, flowing upwardly as the liquid separation processes occur. Problems of such apparatus have occurred in certain situations where there is difficulty in getting the separated liquid at the top of the vessel to freely drain down to the bottom where it can be removed. This difficulty is caused by pressure drops which counter the normal downward flow of the liquid, as for example, where a top separation section is at a lower pressure than the entrance or lower section. This lower pressure tends to keep the liquid in the upper sections and means must be found to balance the pressure drop that is created across the separator with the hydrostatic pressure head available for the liquid to drain downwardly.

SUMMARY OF THE INVENTION

The invention eliminates the problems heretofore associated with prior art devices by using a downflow arrangement wherein the liquid and the gas travel concurrently with each other. This is accomplished in a centrifugal separation process where separation is primarily a function of centrifugal forces and not gravity.

These and other objects of the invention will become apparent upon further reading of the specification and claims and drawings as set forth herein.

The invention is directed to a substantially vertically oriented cylindrical shell closed at its top and bottom and divided by transverse walls into three chambers, a top chamber, a central chamber, and a bottom chamber. A downcomer pipe for the initially separated liquid extends from the top chamber to the bottom chamber. A second downcomer pipe for separated liquid extends from the central chamber to the bottom chamber. A float controlled liquid outlet extends from the bottom chamber which also includes a gas outlet. An axial tube extends from the top chamber to the bottom chamber and is formed of an upper and lower part spaced slightly apart to form a gap which gap is positioned in the upper part of the central chamber. A tangential or centrifugal force is imparted to the input gas-liquid mixture in the top chamber, creating a vortex within the axial tube. Liquid separated in the top chamber travels through the downcomer into the central chamber and thence to the bottom chamber by way of the second downcomer pipe. Gas and entrained liquids within the vortex section travel down the axial tube where liquids therein migrate to the inside surfaces of the tube and are separated at the slot or gap in the central chamber. The remaining gas and entrained liquid, if any, is directed into the lower chamber against a cone-shaped baffle, the apex of which is axially below the lower end of the axial tube. A transverse plate and grid structure below the cone break up the vortex action. Liquid level is controlled and operates suitable equipment, e.g., valves and pumps, to withdraw surplus liquid. Clean gas is withdrawn from the bottom chamber.

BRIEF DESCRIPTION OF THE DRAWINGS

FIG. 1 is a vertical cross-section of the separator of this invention.

FIG. 2 is a sectional view taken along the line 2—2 of FIG. 1.

FIG. 3 is a perspective view of a spinner device used in the axial tube.

FIG. 4 is a partial sectional view of a modified form of axial tube gap.

FIG. 5 is a sectional view taken along line 5—5 of FIG. 1.

DETAILED DESCRIPTION OF THE DRAWINGS

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to the drawings and, in particular to FIG. 1, the separator, generally designated by the numeral 10, is composed of a vertically oriented cylindrical shell 12 closed at its top 14 and bottom 16. The shell is supported upon a base 18. The interior of the separator is divided by transverse walls 17 and 19 to form top chamber 20, central chamber 22, and bottom chamber 24. A first downcomer pipe 26 extends from communication with top chamber 20 into bottom chamber 24. A second downcomer pipe 28 extends from communication with central chamber 22 into bottom chamber 24. An axial tube, generally designated by the numeral 30, includes an upper portion 32 and a lower portion 34 separated in the upper part of the central chamber 22 by a gap 36. Although the axial tubing is shown having the same internal diameter, a modified form as shown in FIG. 4 shows the lower portion 34A having a smaller internal diameter than the upper portion 32. Cross support members 37 retain the upper and lower portions as shown.

A liquid level, e.g., float-operated control 40 maintains a substantially constant level of separated liquid 41 in the bottom chamber, excess liquid being withdrawn by any suitable liquid removal means 42.

The gas-liquid to be separated enters by way of conduit 50 either tangentially into top chamber 20, or, as shown, using baffle 52 which imparts a circular motion to the gas-liquid. Spinner 54 within the upper portion 32 of the axial tube assists the vortex motion therein. In the bottom chamber 24 the apex of cone 60 is positioned upon a transverse plate 62, which, in turn, is supported upon grid 64 below the outlet of the lower portion 34 of the axial tube. A separated gas outlet 68 is provided in the upper part of the bottom chamber 24.

In operation, gas and entrained liquid enter conduit 50 and, deflected by baffle 52, impart a centrifugal motion to the gas liquid in top chamber 20. This motion forms a vortex with liquid being thrown outward where it drains from the top chamber through the first downcomer into the bottom chamber 24. The vortex formed by the gas may be enhanced as it enters the axial tube 30 by spinner means 54. The vortex in the upper portion 32 of the axial tube causes entrained liquid to migrate to the inside surface of the axial tube where it is skimmed off at the gap 36 in the central chamber 22. The liquid_ accumulating in the central chamber 22 thence travels through the second downcomer 28 into the bottom chamber 24. The gas continues to travel through the lower portion 34 of the axial tube existing in the bottom chamber against the cone-shaped baffle 60 where the liquid is coalesced by impingement thereagainst. The liquid continues to drain across the transverse plate 62 and drains into the liquid section of the bottom chamber 24. The grid-type support 64 under the transverse plate 62 assists in breaking up the vortex to form a quieting chamber within which the liquid level control 40 can operate to actuate removal means 42.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element or step thereof is entitled.

What is claimed is:

1. A centrifugal separator for separating liquid from gas having
    a vertically oriented cylindrical shell with a top and bottom,
    the shell divided by transverse walls into three chambers, a top chamber, a central chamber, and a bottom chamber,
    a first downcomer pipe for separated liquids from the top chamber to the bottom chamber, a second downcomer pipe for separated liquid from the central chamber to the bottom chamber,
    an axial tube extending from the top chamber to the bottom chamber, the axial tube formed of two parts, upper and lower, spaced slightly apart to form a gap which is positioned in the upper part of the central chamber, liquid level operated valve means to remove liquid from a lower part of the bottom chamber, the improvement characterized by,
    means to impart circular flow of the liquid and gas mixture into the top chamber to create a vortex within the axial tube, means whereby liquid is first separated to the outside of the top chamber draining into the bottom chamber via the first downcomer pipe, and whereby liquid entrained in the axial tube is substantially removed via the gap, and liquid in the central chamber draining via the second downcomer pipe into the bottom chamber,
    a cone-shaped baffle supported in the bottom chamber, the apex of which is axially below the lower end of the axial tube, the bottom of the cone being of less diameter than the diameter of the bottom chamber, and
    a gas outlet in an upper part of the bottom chamber.

2. A separator of claim 1 the further improvement in a transverse grid structure upon which the bottom of the cone rests.

3. A separator of claim 2 the further improvement of a transverse plate between the grid structure and the bottom of the cone.

4. The separator of claim 1 the further improvement characterized by
    a spinner in the upper part of the axial tube.

5. The separator of claim 1 the further improvement characterized by the lower part of the axial tube having a smaller internal diameter than the upper part.

* * * * *